(12) United States Patent
Kuroda et al.

(10) Patent No.: US 7,347,184 B2
(45) Date of Patent: Mar. 25, 2008

(54) CONTROLLER AND CONTROLLING METHOD FOR INTERNAL COMBUSTION ENGINE

(75) Inventors: Daisuke Kuroda, Kariya (JP); Yukihiro Yamashita, Takahama (JP); Keisuke Tani, Anjo (JP); Kazuyoshi Obayashi, Chita-gun (JP); Katsunori Tanaka, Ichinomiya (JP)

(73) Assignee: Denso Corporation, Kariya, Aichi-pref. (JP)

( * ) Notice: Subject to any disclaimer, the term of this patent is extended or adjusted under 35 U.S.C. 154(b) by 0 days.

(21) Appl. No.: 11/589,999

(22) Filed: Oct. 31, 2006

(65) Prior Publication Data
US 2007/0106451 A1  May 10, 2007

(30) Foreign Application Priority Data
Nov. 1, 2005 (JP) .............................. 2005-317844
Nov. 22, 2005 (JP) .............................. 2005-336470

(51) Int. Cl.
*F02M 1/00* (2006.01)
*F02D 41/00* (2006.01)

(52) U.S. Cl. ............. 123/434; 123/339.12; 123/406.23

(58) Field of Classification Search ................ 123/434, 123/492, 339.12, 339.16, 339.23, 478, 480, 123/406.23; 701/101, 103
See application file for complete search history.

(56) References Cited

U.S. PATENT DOCUMENTS

| 4,459,489 | A | 7/1984 | Kirk et al. |
| 5,111,788 | A | 5/1992 | Washino |
| 5,495,835 | A * | 3/1996 | Ueda ..................... 123/339.11 |
| 6,513,489 | B2 * | 2/2003 | Osanai ................. 123/339.11 |
| 6,857,414 | B2 * | 2/2005 | Ogawa et al. ............. 123/295 |
| 2004/0164616 | A1 | 8/2004 | Obayashi et al. |
| 2006/0271257 | A1 | 11/2006 | Kuboda et al. |

FOREIGN PATENT DOCUMENTS

| JP | 64-080752 | 3/1989 |
| JP | 2000-130203 | 5/2000 |

* cited by examiner

*Primary Examiner*—John T. Kwon
(74) *Attorney, Agent, or Firm*—Nixon & Vanderhye P.C.

(57) ABSTRACT

A base engine torque generated with an estimated intake air amount is estimated. An engine torque is corrected by correcting an ignition timing based on a difference between a required engine torque and the base engine torque. A torque correction amount is calculated based on a correction amount of the ignition timing. An actual engine torque is estimated based on the calculated torque correction amount and the base engine torque. A permitted component driving torque is a difference between the actual engine torque and the required vehicle driving torque. A component is controlled based on the permitted component driving torque.

4 Claims, 11 Drawing Sheets

CONTROLLER AND CONTROLLING METHOD FOR INTERNAL COMBUSTION ENGINE

CROSS REFERENCE TO RELATED APPLICATIONS

This application is based on Japanese Patent Applications No. 2005-317844 filed on Nov. 1, 2005, and No. 2005-336470 filed on Nov. 22, 2005, the disclosure of which are incorporated herein by reference.

FIELD OF THE INVENTION

The present invention relates to a controller for an internal combustion engine, and a controlling method for an internal combustion engine. The internal combustion engine is provided with function in which driving torque of components, which is driven by an engine torque, is controlled. The engine torque represents an output torque of the engine.

BACKGROUND OF THE INVENTION

A vehicle is equipped with components which are driven by engine. For example, the engine is equipped with an alternator, a compressor for air conditioner, a high-pressure pump for increasing fuel pressure, an oil pump, a motor generator, and the like. Since, these components are driven by the engine, a fluctuation in engine speed and/or unintentional acceleration/deceleration of the vehicle may be arose when driving torque of the components are rapidly changed.

Japanese Patent No. 2709061 shows that an intake air amount and an ignition timing are corrected at a time of switching of an air-conditioner in order to restrict the fluctuation in idle speed due to the switching of air-conditioner.

Generally, since the engine torque is controlled based on a throttle position (intake air amount) or a fuel injection amount, a response delay exists in an intake system. That is, there is time lag between a time when the throttle position is varied and a time when the engine torque is changed.

In the above Japanese Patent, both intake amount and ignition timing are corrected when the air-conditioner is turned on/off. The correction of the engine torque based on the correction of the ignition timing causes no response delay unlike the correction of the intake air amount. The torque correction amount which is delayed by the intake air amount correction is ensured by the correction of the ignition timing.

However, the torque which can be ensured by correcting the ignition timing is limited. When the ignition timing is close to a knocking limit or a stable combustion limit, a permitted correcting range of the ignition timing is relatively narrow and the torque correction amount is small. Thereby, when the driving torque of components are rapidly changed, even if both intake air amount and ignition timing are corrected, the torque correction amount runs shortage relative to the rapid change in driving torque of the components, which may cause the fluctuation in engine speed and the acceleration/deceleration of the vehicle.

The above fluctuation in engine speed and the acceleration/deceleration of the vehicle can be restricted if the increased (decreased) driving torque of the components are canceled by the increased (decreased) engine torque. In this case, the increased/decreased amount of driving torque of components may be estimated based on control parameters of the components. However, the estimated value of the increased/decreased amount of driving torque of the components must includes some errors due to a individual productive dispersion or an aging thereof. Furthermore, the engine torque command value may be deviated from the actual engine torque due to such a dispersion and aging.

Even if the increased amount (decreased amount) of the driving torque of the components and the increased amount (decreased amount) of the engine torque are controlled in synchronization with each other, the torque error cannot be avoided. The above fluctuation in engine speed and unintentional acceleration/deceleration cannot be restricted enough.

SUMMARY OF THE INVENTION

The present invention is made in view of the foregoing matter and it is an object of the present invention to provide an engine controller and engine control method which can restrict fluctuation in engine speed and/or unintentional acceleration/deceleration when driving torque of components are rapidly changed.

According to a controller of the present invention, including: a component torque calculating means for calculating a required component driving torque; an engine torque calculating means for calculating a required engine torque which is obtained by adding a required vehicle driving torque to the required component driving torque; an intake air calculating means for calculating a required intake air amount; an intake air controlling means for controlling an intake air amount based on the required intake air amount; a base engine torque estimating means for estimating an actual intake air amount, and estimating a base engine torque; a torque correction means for correcting the engine torque by correcting an ignition timing based on a difference between the required engine torque and the base engine torque; an actual engine torque estimating means for calculating a torque correction amount based on a correction amount of the ignition timing, and estimating an actual engine torque based on the calculated torque correction amount and the base engine torque; a permitted torque calculating means for calculating a difference, as a permitted component driving torque, between the actual engine torque and the required vehicle driving torque; and a component controlling means for controlling the component based on the permitted component driving torque.

According to another aspect of the invention, a controller including: a component controlling means for controlling a component; a torque correcting means for correcting a control error of an output torque of the engine; a learning means for learning a torque correction amount, while a torque necessary to drive the component is varied in a cased where a predetermined torque correction amount learning condition is established, and an engine controlling means for controlling the output torque of the engine by correcting a torque command value based on a lean-value of the torque correction amount.

BRIEF DESCRIPTION OF THE DRAWINGS

The above and other objects, features, and advantages of the present invention will become more apparent from the following detailed description made with reference to the accompanying drawings, in which like parts are designated by like reference number and in which.

DETAILED DESCRIPTION OF THE PREFERRED EMBODIMENTS

Embodiments of the present invention will be described hereinafter with reference to the drawings.

First Embodiment

Figure 1:
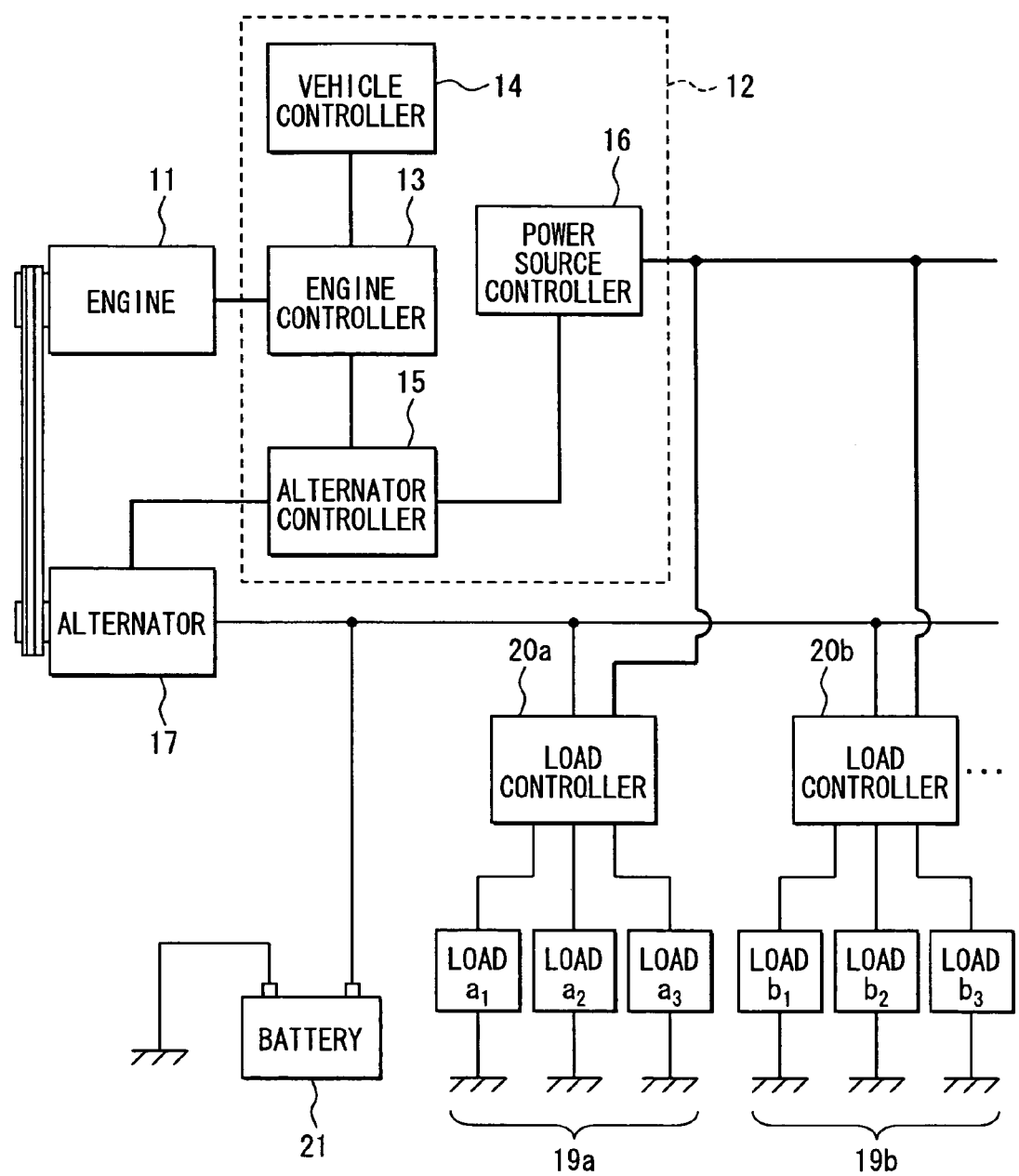
FIG. 1 is a schematic block diagram showing an engine control system according to a first embodiment.

FIG. 1 is a schematic view showing an engine control system. Each device of air system, fuel injection system and ignition system of an engine 11 is controlled by an engine controller 13 which is included in a controlling apparatus 12. The controlling apparatus 12 includes a vehicle controller 14, an alternator controller 15, and a power source controller 16. These controllers are electrically connected with each other.

The vehicle controller 14 calculates a required vehicle driving torque, which represents an engine torque necessary for driving the vehicle. A signal indicative of the required vehicle driving torque is transmitted to the engine controller 13.

The alternator controller 15 controls electric current generated by an alternator 17 by controlling electric current applied to filed coils of the alternator 17 based on a permitted power generation torque (permitted components driving torque)

The power source controller 16 is electrically connected to the alternator controller 15 and load controllers 20a, 20b. The load controllers 20a, 20b control electric loads 19a, 19b. The power source controller 16 detects conditions of the electric load 19a, 19b (consumption current of electric load) and a charging condition of a battery 21 to calculate a generating current which is required to the alternator 17. This generating current is referred to as a required-generate-current (RGC) hereinafter. Furthermore, the power source controller 16 calculates a required-power-generation-torque to drive the alternator 17 according to the RGC. This required-power-generation-torque is referred to as the RPGT, hereinafter.

These four controllers 13-16 can be comprised of four computers (ECU) or single computer.

Figure 2:
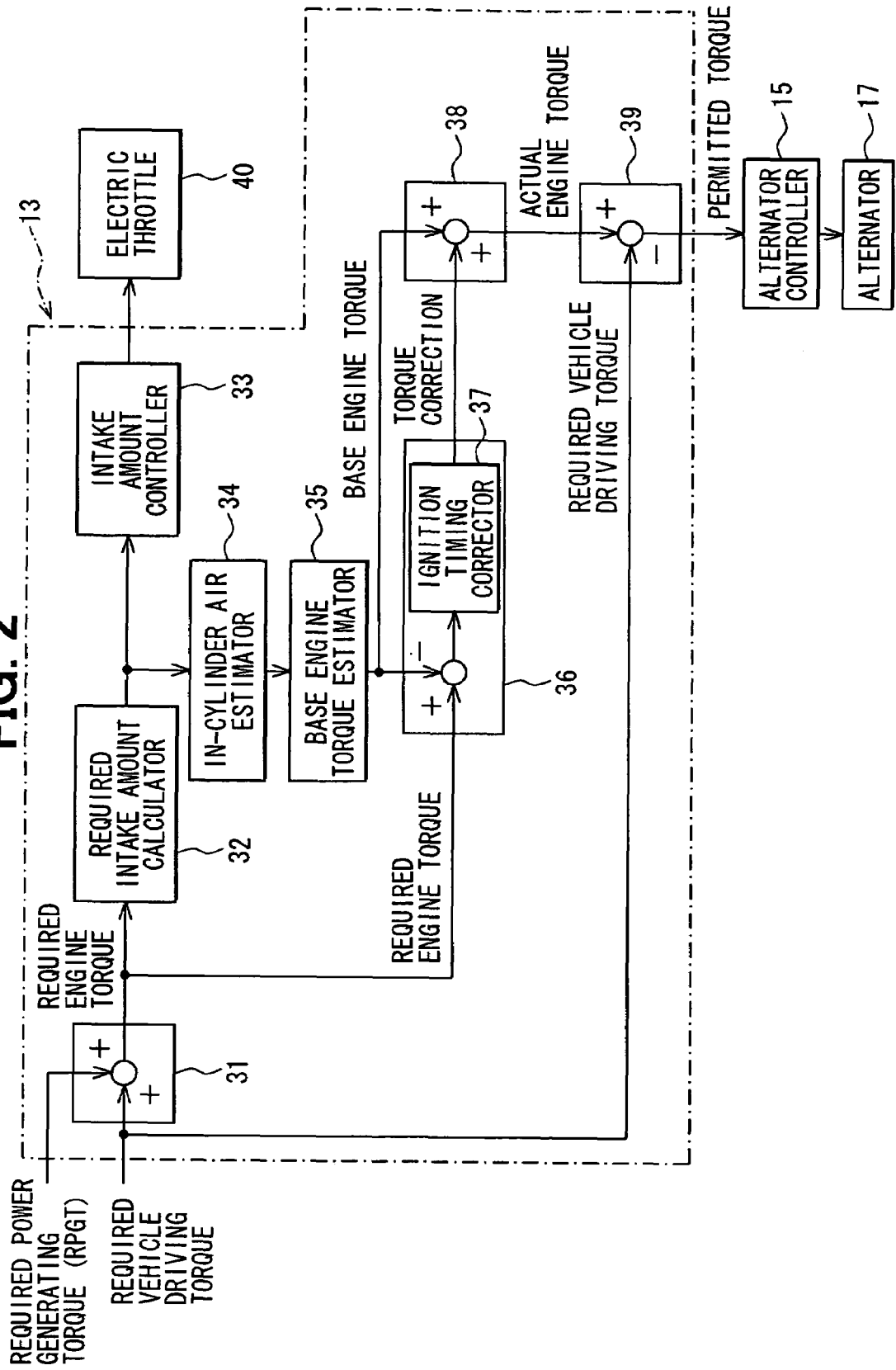
FIG. 2 is a block diagram for explaining function of a control system according to the first embodiment.

Referring to FIG. 2, a cooperative control of the alternator 17 and the engine 11 will be described hereinafter. The engine controller 13 is comprised of a required engine torque calculator 31, a required intake air amount calculator 32, an intake air amount controller 33, an in-cylinder air amount estimator 34, a base engine torque estimator 35, a torque corrector 36, an ignition timing corrector 37, an actual engine torque estimator 38, and a permitted power generation torque calculator 39.

The required engine torque calculator 31 calculates a required engine torque which is derived by adding the required vehicle driving torque to the RPGT.

The required intake air amount calculator 32 calculates an intake air amount which is necessary to generate the required engine torque. The intake air amount controller 33 controls a throttle position of an electric throttle apparatus 40 according to the required intake air amount.

The in-cylinder air amount estimator 34 estimates an actual air amount which is introduced into a cylinder by inputting a value of the required intake air into a intake system model. This intake system model simulates behavior of intake air which is passed through the throttle valve and is introduced into the cylinder. The base engine torque estimator 35 estimates the engine torque with the estimated in-cylinder air amount, which is referred to a base engine torque. Furthermore, the base engine torque estimator 35 estimates the base engine torque considering the ignition timing and/or the fuel injection amount. That is, since the in-cylinder air amount, the ignition timing, and the fuel injection amount are important factors to change the engine torque, the base engine torque can be accurately estimated based on these factors.

The torque corrector 36 calculates a difference between the required engine torque and the base engine torque. The ignition timing corrector 37 calculates a correction amount of the ignition timing based on the difference and corrects the ignition timing to correct the engine torque. The torque corrector 36 is provided with an ignition correction guard (not shown) which sets a correction limit of the ignition timing according to the engine driving condition. The torque corrector 36 sets a correction amount of the ignition timing in such a manner that the torque correction amount is brought to be close to the difference.

The actual engine torque estimator 38 estimates the actual engine torque which is generated at the next calculation timing by adding the torque correction amount to the base engine torque. The permitted power generation torque calculator 39 calculates a difference between the estimated actual engine torque and the required vehicle driving torque as the permitted power generation torque (permitted component driving torque).

The alternator controller 15 controls electric current generated by the alternator 17 by controlling electric current applied to filed coils of the alternator 17 based on a permitted power generation torque calculated by the permitted power generation torque calculator 39.

Figure 3:
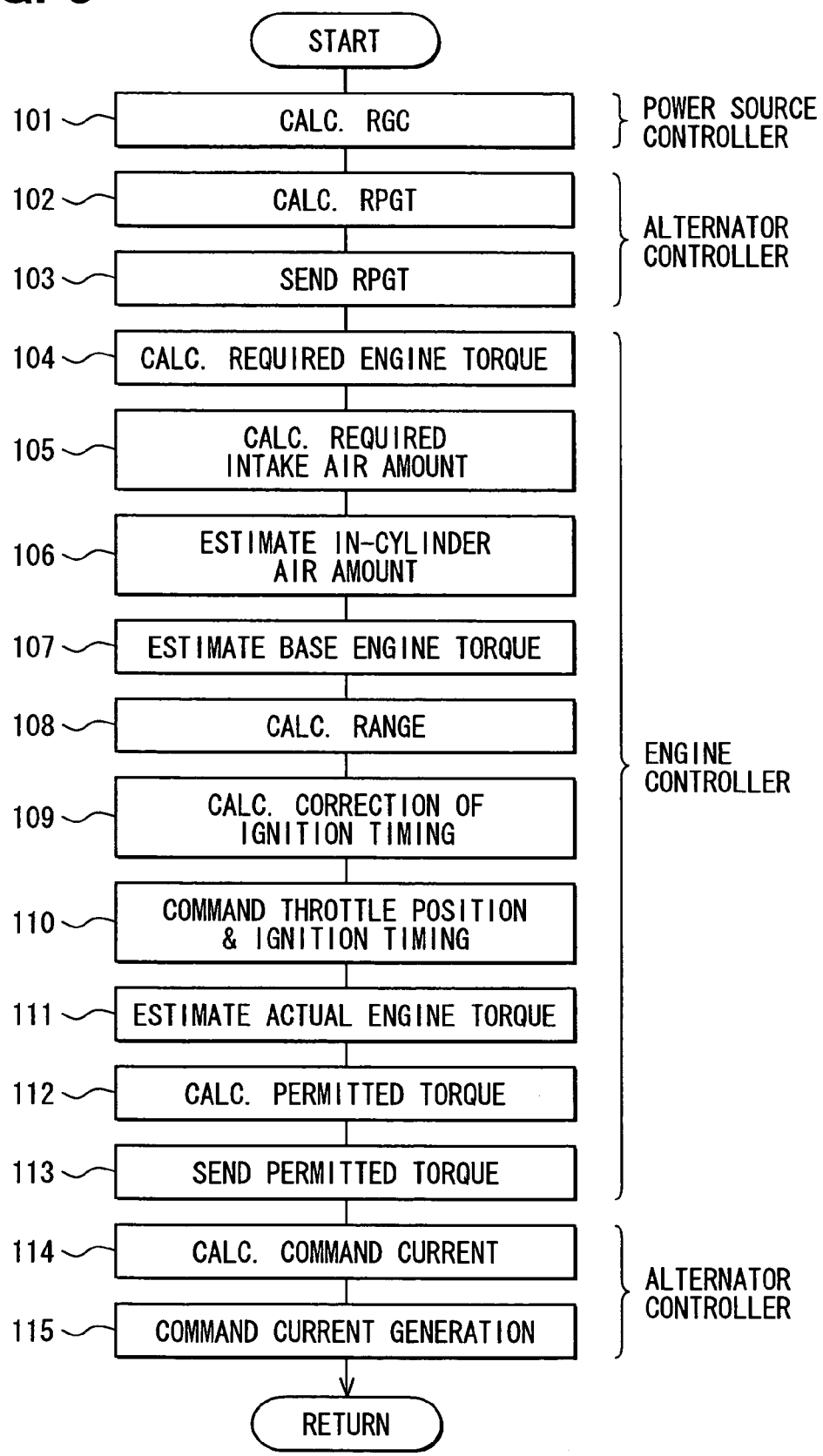
FIG. 3 is a flowchart showing a cooperative control between an alternator and an engine.

The cooperative control described above is performed by executing a cooperative control program shown in FIG. 3. This cooperative control program is executed every predetermined period (for example, 8 ms interval) while the engine is ON. In step 101, the power source controller 16 calculates the RGC based on the operation condition, such as consumption current, of the electric loads 19a, 19b, and sends signal indicative of the RGC to the alternator controller 15.

In step 102, the alternator controller 15 calculates the RPGT by use of the alternator model. The alternator model calculates the power generation torque based on the RGC, the alternator speed, and the power source voltage. In step 103, the signal indicative of the RPGT is transmitted to the engine controller 13.

In step 104, the engine controller 13 calculates the required engine torque which is a total of the RPGT and the required vehicle driving torque. In step 105, the engine controller 13 calculates the intake air amount which is necessary to generate the required engine torque. In step 106, the engine controller 13 estimates the actual air amount which is sucked into the cylinder by inputting the required intake air amount into the intake air system model which simulates a delay of response in the intake air system. Then, the engine controller 13 estimates the base engine torque.

In step 108, the engine controller 13 calculates a range in which ignition timing can be established from a map. This range corresponds to the correction limit of the ignition timing.

In step 109, the engine controller 13 calculates the difference between the required engine torque and the base torque. Base on this difference, the correction amount of the ignition timing is determined so that the torque correction amount, which is obtained by correction of the ignition timing within the correction limit, is brought to be close to the difference. In step 110, the engine controller 13 sends signals indicative of the throttle position and the ignition timing to obtain the required engine torque to the engine 11.

In step 111, the engine controller 13 estimates the actual engine torque which can be realized in the next calculation timing by adding the torque correction amount to the base engine torque. In step 112, the engine controller 13 calculates the permitted power generation torque which is a difference between the actual engine torque and the required vehicle driving torque. In step 113, the engine controller 13 sends signals indicative of the permitted power generation torque to the alternator controller 15.

In step 114, the alternator controller 15 calculates a command power generation current corresponding to the permitted power generation torque. In step 115, the alternator controller 15 controls the control current (magnetic current) to the alternator 17.

Figure 4:
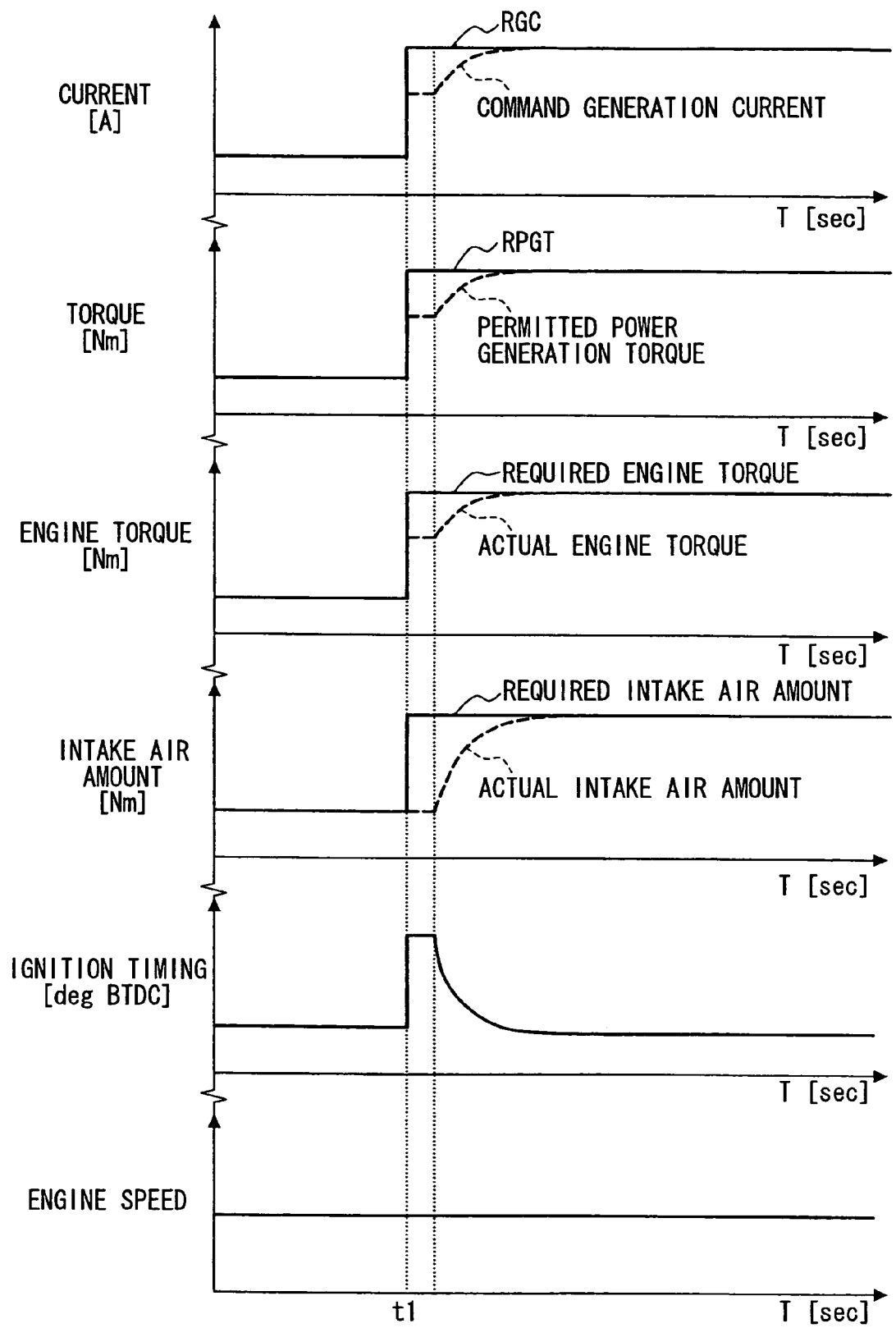
FIG. 4 is a time chart for explaining a control according to the first embodiment.

Operations and advantages of the first embodiment will be described based on a time chart shown in FIG. 4. In FIG. 4, the RGC is stepwise increased at a time of t1.

As shown in FIG. 4, when the RGC is stepwise increased at the time of t1, the RPGT, the required engine torque, and the required intake air amount (throttle position) are also stepwise increased. However, a response delay is generated in the intake system until the variation in throttle position appears as the variation in engine torque. The response delay represents a time delay until the intake air passed through the throttle valve is introduced into the cylinder. The variation in engine torque represents a variation in in-cylinder air amount.

The ignition timing is corrected considering the response delay in the intake system at the time of t1. However, the torque ensured by correcting the ignition timing is limited. Furthermore, in a case where the engine is driving with the ignition timing which is close to a knocking limit or a stable combustion limit, the permissible correction range of the ignition timing is rather narrow, and the correction amount of torque is rather small by correcting the ignition timing. Thus, when the RGC (RPGT) is rapidly increased, the correction amount of torque runs shortage relative to the rapid increment of the RPGT even if the ignition timing is corrected with the intake air amount.

According to the first embodiment, the in-cylinder air amount is estimated considering the response delay in the intake system, and the base engine torque is estimated according to the estimated in-cylinder air amount. The ignition timing is corrected based on the difference between the required engine torque and the base engine torque. The correction amount of torque is calculated by correcting the ignition timing. The actual engine torque is estimated by adding the correction amount of torque to the base engine torque. The difference between the estimated actual engine torque and the required vehicle driving torque is calculated as the permitted power generation torque by which the alternator 17 is driven. Thus, even if the RGC or the RPGT is rapidly changed, the alternator is driven by the permitted power generation torque to drive the vehicle at the required vehicle driving torque. That is, unintentional acceleration or deceleration of the vehicle can be avoided when the RGC or the RPGT is rapidly changed.

Furthermore, according to the first embodiment, the permitted power generation torque is brought to be close to the RPGT, so that the responsiveness with respect to the RPGT can be enhanced in the range of the ignition timing correction limit.

Second Embodiment

In a case of a direct injection engine, the engine torque can be corrected by correcting the fuel injection amount. Referring to FIG. 2, a second embodiment will be described hereinafter.

A torque corrector 36a corrects the fuel injection amount by use of a fuel injection amount corrector 37a based on a difference between the required engine torque and the base engine torque. The torque corrector 36a calculates the torque correction amount based on the correction amount of the fuel injection amount. An actual engine torque estimator 38 estimates the actual engine torque which can be realized in the next calculation timing by adding the torque correction amount to the base engine torque. A permitted power generation torque calculator 39 calculates a difference between the actual engine torque and the required vehicle driving torque. This difference corresponds to the permitted power generation torque. The alternator 17 is driven with this permitted power generation torque. Thereby, in the direct injection engine, even if the fuel injection amount is corrected at a time when the driving torque of the alternator 17 is rapidly changed, the vehicle is driven with the required vehicle driving torque, so that unintentional acceleration or deceleration of the vehicle can be avoided.

A fuel correction guard can be provided to establish a correction limit of the fuel injection amount, which is set by the torque corrector 37a. The correction amount of the fuel injection amount can be set in such a manner that the torque correction amount is brought to be close to the difference between the required engine torque and the base engine torque. The responsiveness with respect to the RPGT can be enhanced in the range of the ignition timing correction limit.

Figure 5:
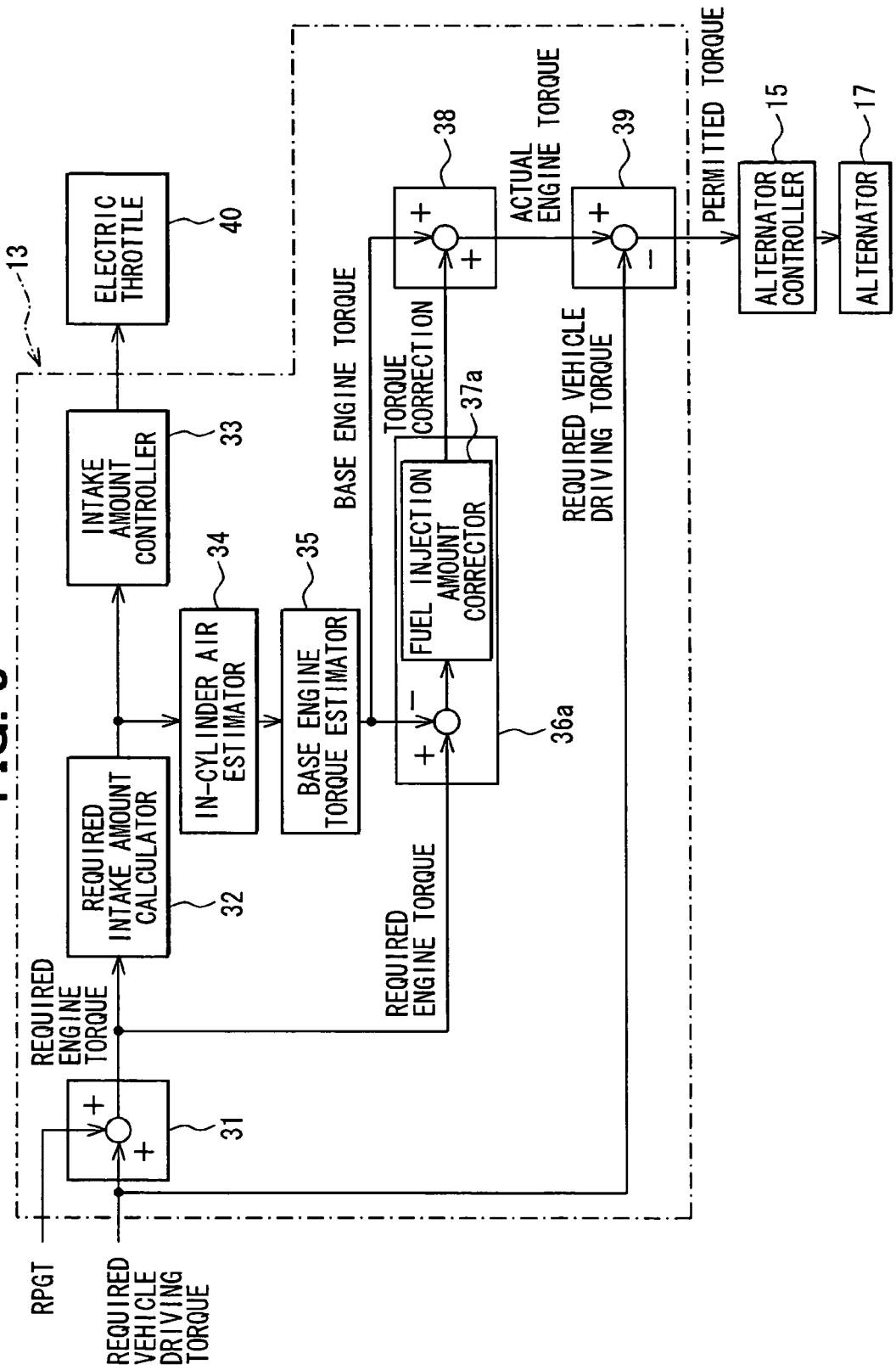
FIG. 5 is a block diagram for explaining function of a control system according to a second embodiment.

In the second embodiment shown in FIG. 5, the required engine torque calculator 31, the required intake air amount calculator 32, the intake air controller 33, the in-cylinder air amount estimator 34, the base engine torque estimator 35, the actual engine torque estimator 38 and the permitted power generation torque calculator 39 have the same function as those in the first embodiment. The engine torque can be corrected by correcting the fuel injection timing and the fuel injection amount.

The component which is cooperative controlled is not limited to the alternator 17. A compressor for air conditioner, a compressor for power steering, or a motor generator can be used as the component.

Third Embodiment

Figure 6:
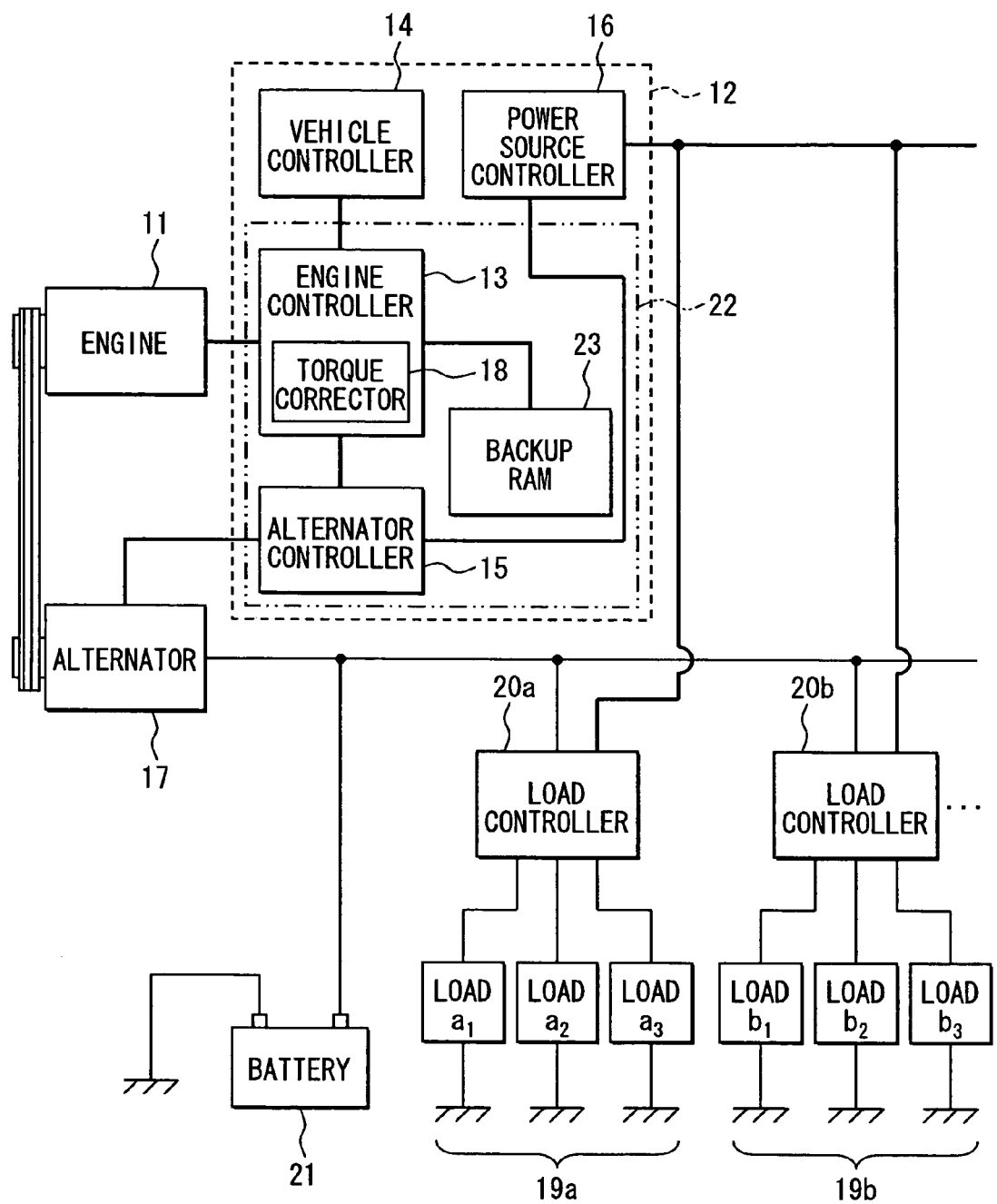
FIG. 6 is a schematic block diagram showing an engine control system according to a third embodiment.

Referring to FIG. 6, a third embodiment will be described hereinafter. In the third embodiment, the same parts and components as those in the first embodiment are indicated with the same reference numerals and the same descriptions will not be reiterated.

The engine controller 13 includes a torque corrector 18, which corrects control error of the engine torque. The engine controller 13 and the alternator controller 15 function as a torque correction amount learning unit 22. When a torque correction amount learning condition is established, the unit 22 changes torque, which is necessary to drive the alternator 17, by control current and learns the torque correction amount corrected by the torque corrector 18. This learn-value is stored in a backup RAM 23. The engine controller 13 corrects a torque command value transmitted from the vehicle controller 14 based on the learn-value, and controls the engine torque.

When the driving torque of the alternator 17 is rapidly changed while the engine is running, it causes a fluctuation of the engine speed or unintentional acceleration or deceleration of the vehicle.

When the increasing amount (or decreasing amount) of the power generation torque is cancelled by the increasing amount (or decreasing amount) of the engine torque by synchronization with each other, the fluctuation of the engine speed and unintentional acceleration or deceleration can be restricted.

The increase and decrease amount of the power generation torque can be estimated from a variation amount in control current of the alternator 17. However, individual productive dispersion or aging of the alternator 17 generates errors of the estimated value of the increase and decrease amount of the power generation torque. Furthermore, the engine torque command value and the actual engine torque include errors.

Therefore, the fluctuation of the engine speed and the unintentional acceleration or deceleration cannot be restricted enough unless the error of torque is corrected.

Figure 7:
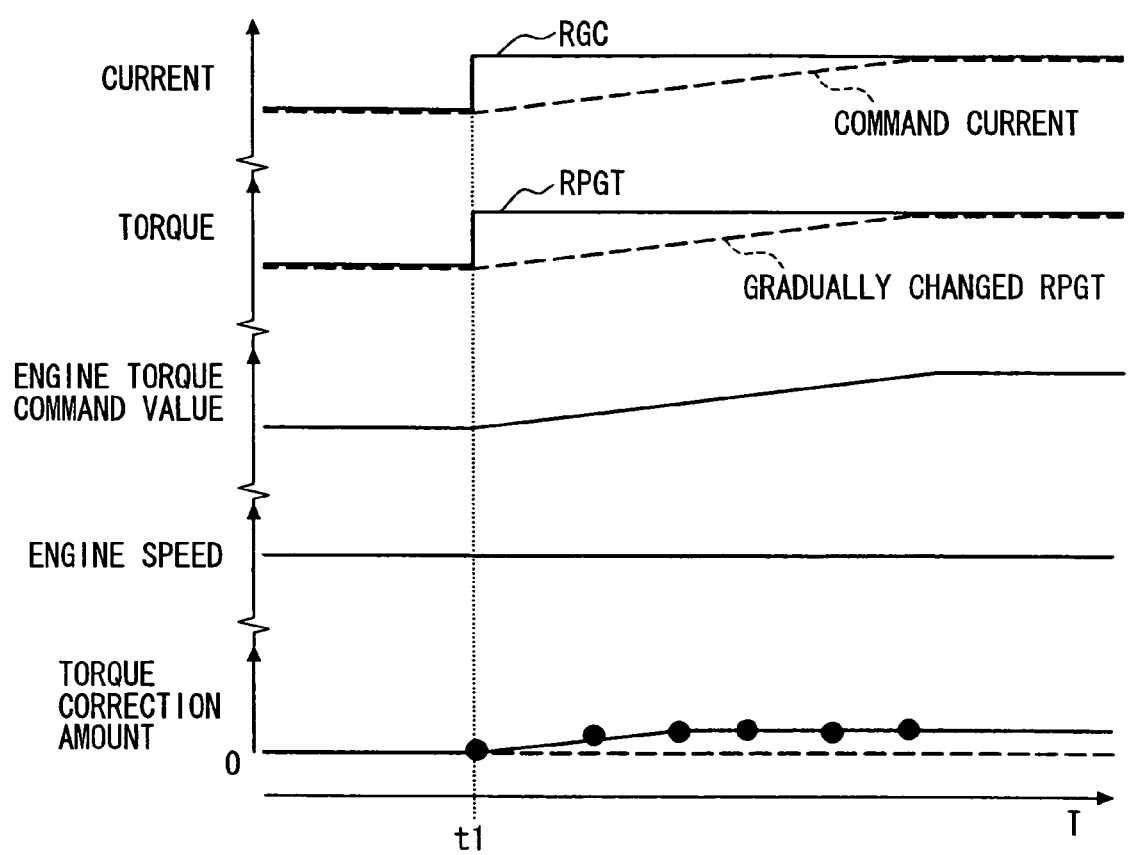
FIG. 7 is a time chart showing a control of torque correction amount learning process.

According to the present embodiment, the torque error is learned, and the torque command value is corrected based o the learn-value. Referring to FIG. 7, the learning method of the torque error is described hereinafter.

At a time of t1 in which a torque correction amount learning condition is established, the RGC is increased by a predetermined value and the RPGT is increased by a predetermined value. Thereby, the command power generation current (control current of the alternator 17) and the power generation torque are changed in synchronization with each other in a learn-period of the torque correction amount. When the variation in power generation torque per a control period is excessively large, the fluctuation in engine speed and the acceleration and deceleration of the vehicle becomes large.

In the present embodiment, the RPGT is gradually increased so that the variation in power generation torque is restricted, whereby the variation in engine speed and the variation in acceleration and deceleration speed are limited within a predetermined range.

During learn-period of correction amount of torque, the RPGT is gradually increased to set the increased RPGT as the permitted power generation torque and to gradually increase the torque command value of the engine 11 in synchronization with the permitted power generation torque. That is, the increasing amount of the torque command value in a control period is equal to the increasing amount of the permitted power generation torque in a control period.

As described above, the torque command value of the engine 11 is gradually increased in synchronization with the permitted power generation torque, and the correction amount of torque, which is necessary to make the engine speed consistent with the target engine speed, is calculated. This correction amount of torque is stored in the backup RAM 23 as the learn-value.

Figure 8A:
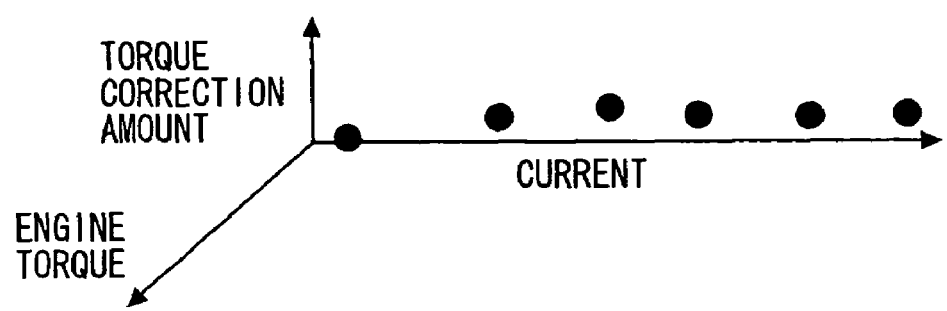
FIGS. 8A and 8B are charts showing torque correction amount learning maps.
Figure 8B:
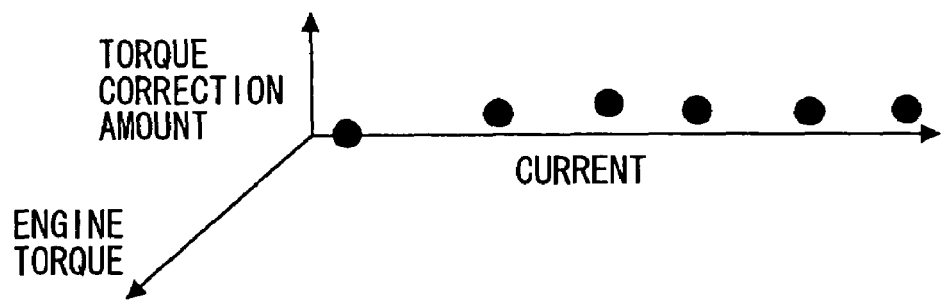
Figure 9:
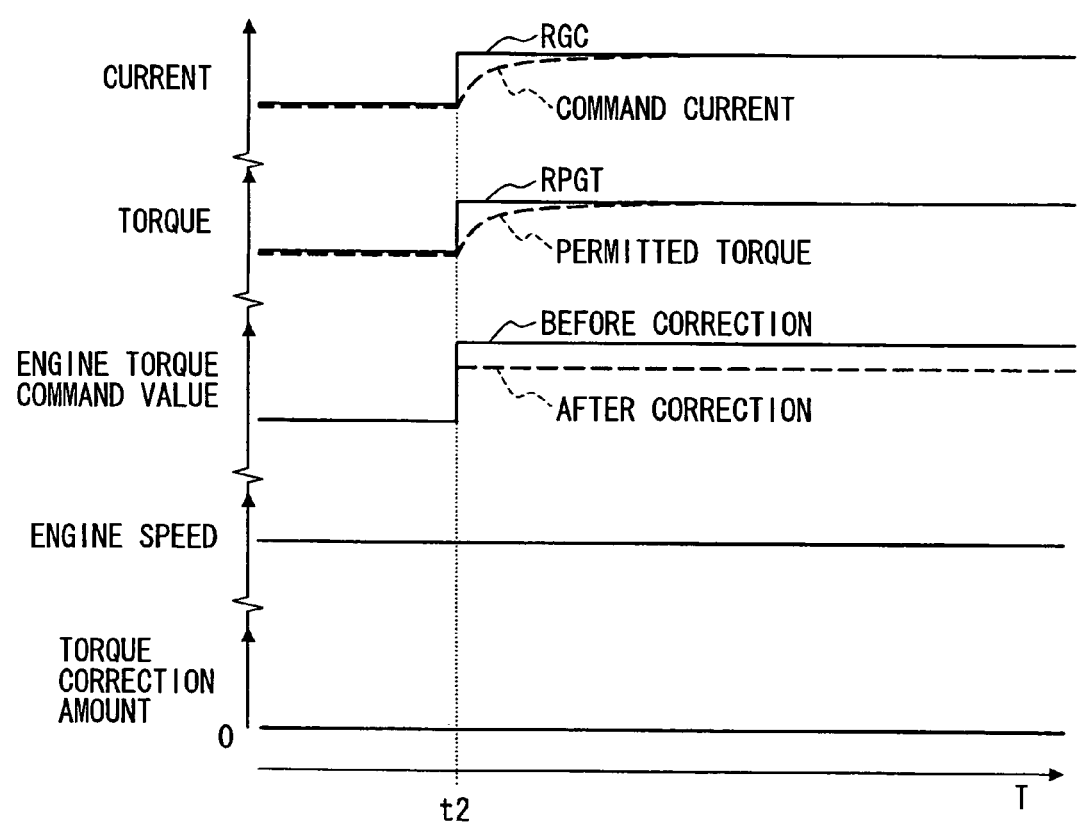
FIG. 9 is a time chart showing a control after torque correction amount is learned.

The learning process is repeated changing the power generation current to make a three-dimensional map as shown in FIGS. 8A and 8B. The power generation current and the engine torque are parameters in this map. Furthermore, such maps are made every engine speed. FIG. 8A is a map in a case that the engine speed is 650 rpm, and FIG. 8B is a map in a case that the engine speed is 550 rpm. The power generation current, the engine torque, and the engine speed can be parameters of the map.

After the correction amount of torque is learned, the torque command value is corrected based on the learn-value to control the engine torque, as shown in FIG. 4. For example, at a time of t2 in FIG. 4, when the RGC and the RPGT are stepwise increased, the torque command value is also stepwise increased. This torque command value is corrected based on the learn-value to control the engine torque (Corrected torque command value=Pre-corrected torque command value−Learn-value). Considering a response delay of actual engine torque, the command power generation current is varied with a predetermined delay with respect to a variation in RGC. The permitted power generation torque is varied with a predetermined delay with respect to the RPGT.

Figure 10:
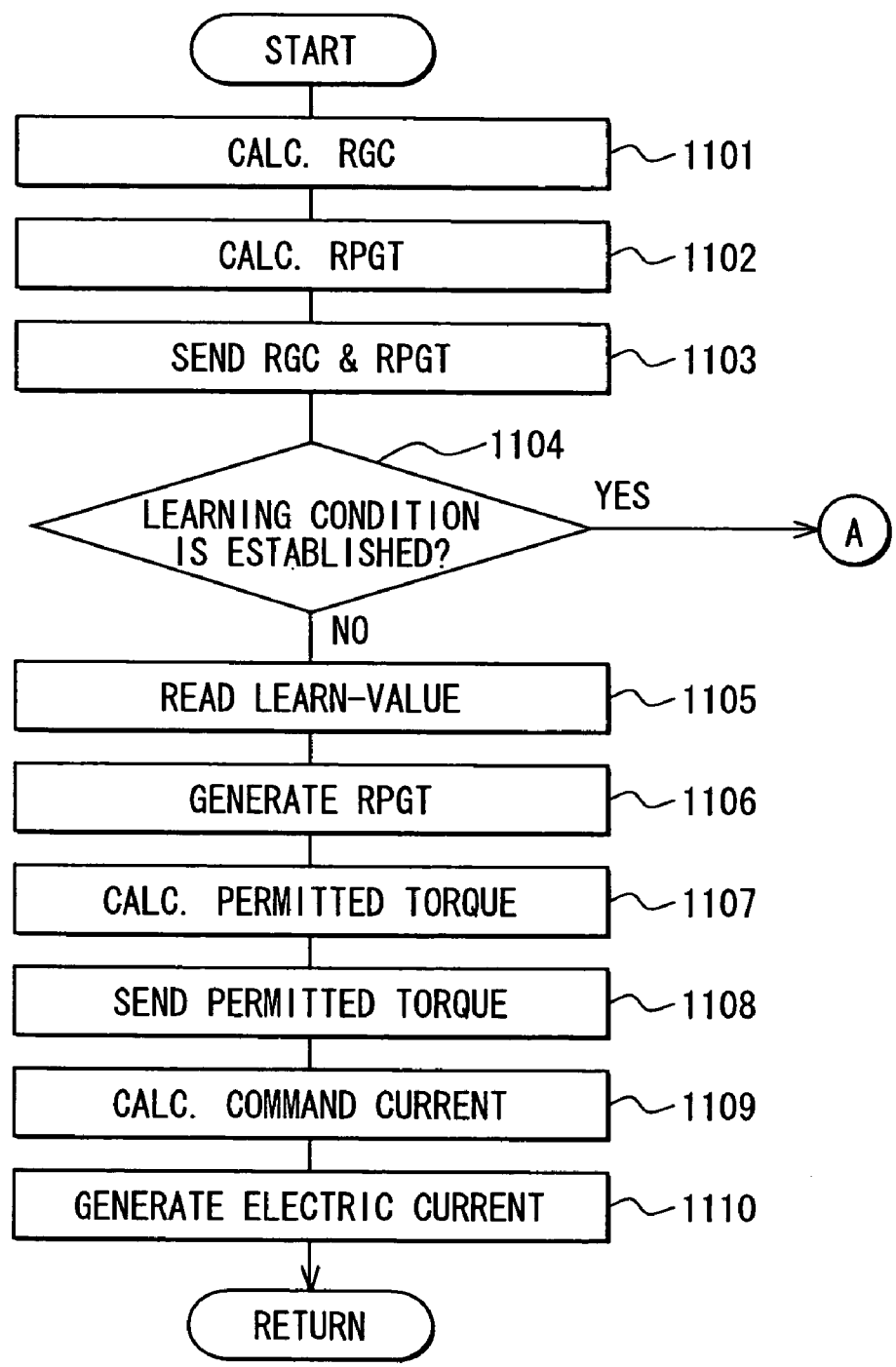
FIG. 10 is a flow chart showing a cooperative control.
Figure 11:
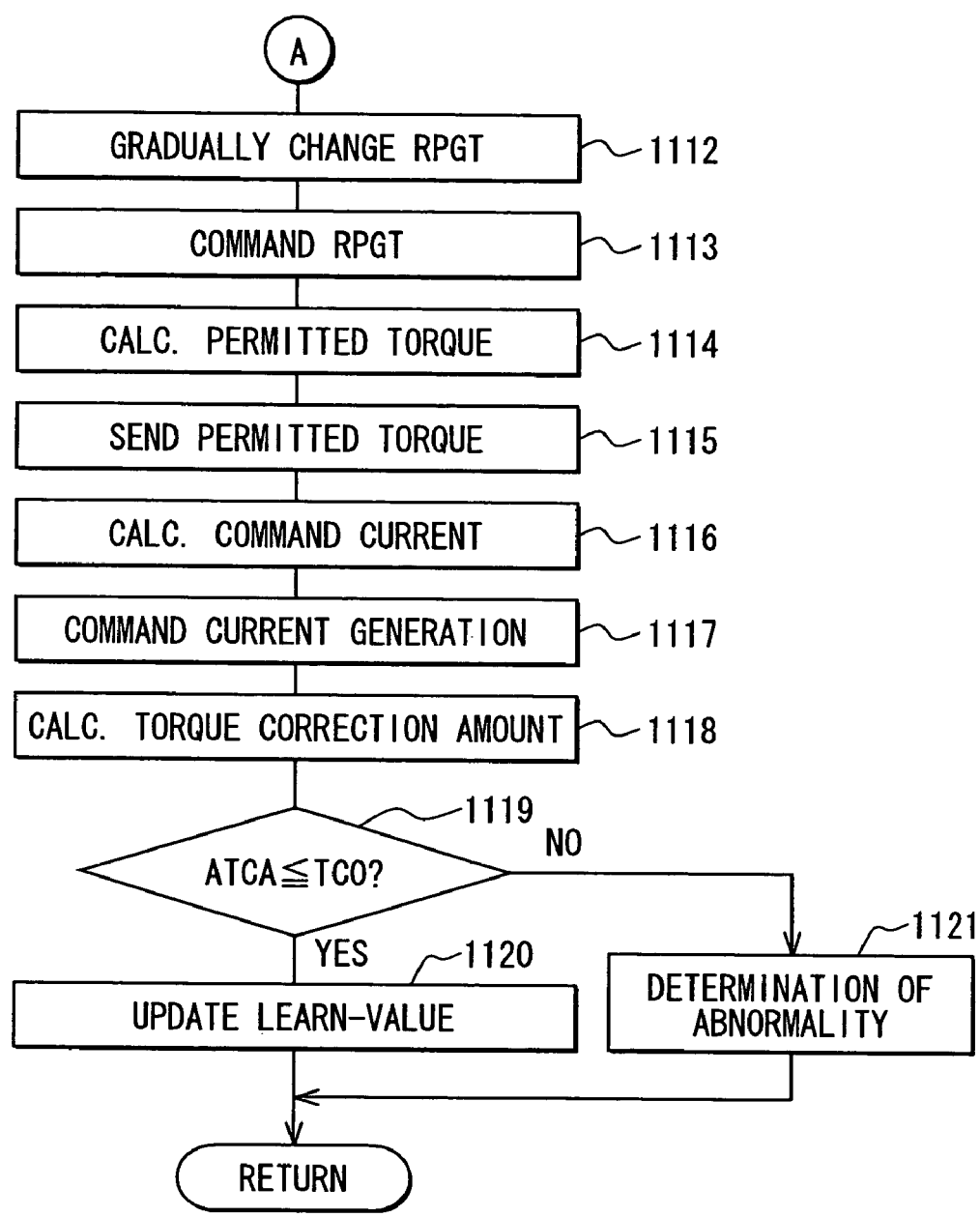
FIG. 11 is a flow chart showing the cooperative control.

The cooperative control of the engine 11 and the alternator 17 are performed according to the cooperative control program shown in FIGS. 10 and 11. This program is executed in a predetermined period (for example, 8 ms period) while the engine is running. In step 1101, the alternator controller 15 calculates the RGC based on the operation condition of the electric loads 19a, 19b and the charging condition of the buttery 21.

In step 1102, the alternator controller 15 calculates the RPGT by use of an alternator model. In step 1103, the alternator controller 15 sends signals indicative of the RPGT and the RGC to the engine controller 13.

In step 1104, it is determined whether a torque correction amount learning condition is established based on following conditions.

(1) An idle speed limit condition is established.

(2) The learn-value in learning area corresponding to the engine speed, the engine torque, and the power generation current has not been updated for a predetermined time period.

When both of the above conditions are satisfied, the torque correction amount learning condition is established. When at least one of the above conditions is not satisfied, the learning condition is not established.

When the answer is Yes in step 1104, the procedure proceeds to step 1112 of FIG. 11 to learn the torque correction amount. In step 1112, the RPGT is gradually changed. In step 1113, the engine controller 13 sends the torque command value to the engine 11 in order to generate the RPGT which has gradually changed. The engine torque is brought to be the torque command value by controlling at least one of the intake air amount, the fuel injection amount, the fuel injection timing, and the ignition timing.

In step 1114, the engine controller 13 estimates the engine torque which will be generated after predetermined calculation timing, and calculate the permitted power generation torque, which is able to supplied to the alternator 17. In step 1115, this permitted power generation torque is transmitted to the alternator 15.

In step 1116, the power generation current corresponding to the permitted power generation torque is calculated as the command power generation current. In step 1117, the control current of alternator 17 is controlled so that the alternator generates the electric current corresponding to the command power generation current.

In step 1118, the variation in engine speed caused by a change i required power generation torque is calculated, and a correction amount of the engine torque is calculated, which is necessary to bring the current engine speed to be consistent with the target engine speed. This correction amount of the engine torque corresponds to the torque error due to the individual dispersion or aging.

In step 1119, it is determined whether an absolute value of the torque correction amount ATCA is smaller than a predetermined value TC0. When the answer is No, the procedure proceeds to step 1121 in which it is determined that the learn-value is abnormal to end the program. Thereby, an erroneous leaning of the torque correction amount is prevented to enhance a reliability of the torque learn-value, and a diagnosis of the system can be performed.

When the answer is Yes, the procedure proceeds to step 1120 in which the learn-value of torque correction amount is updated with the correction amount calculated in step 1118.

When the answer is No in step 1104, the procedure proceeds to step 1105 in which the learn-value of the torque correction amount is read. This learn-value of the torque correction amount is stored in a learn-region corresponding to the current engine speed, the engine torque, and the power generation current. When no learn-value is learned in this learn-region, an initial value (for example, 0) is learned as a learn-value of the torque correction amount.

In step 1106, the engine controller 13 sends a torque command value to the engine 11 in order to generate the RPGT, whereby the engine torque is controlled to the torque command value.

In step 1107, the engine controller 13 estimates an engine torque which is realized after a predetermined calculation timing, considering a response delay of the engine 11. A difference between the estimated engine torque and the torque necessary to drive the vehicle is calculated as the permitted power generation torque. In step 1108, the permitted power generation torque is transmitted to the alternator controller 15.

In step 1109, the power generation current corresponding to the permitted power generation torque is calculated as the command power generation current. In step 1110, the control current of the alternator 17 (field current) is controlled to generate the electric current corresponding to the command power generation current.

According to this embodiment, when the torque correction amount learning condition is established, the driving torque of the alternator 17 is changed and the torque correction amount is learned as the torque error to control the engine torque. Thus, even if the torque error exists, the torque command value (RPGT) can be corrected by the torque error, so that a fluctuation in engine speed can be restricted due to a rapid change in the driving torque of the alternator 17.

In a case that the torque correction amount is learned while the engine is running, the engine torque can be feedback-corrected based on a vehicle speed or acceleration/deceleration of the vehicle to learn the torque correction amount. For example, in a vehicle provided with a cruise control system, the torque correction amount can be learned during a constant speed driving.

In the present embodiment, since the torque correction amount is learned every learn-region corresponding to the engine speed, the engine torque, the generating current, the torque correction amount is precisely learned every engine driving condition and generating current of the alternator 17.

The present invention is not limited to a structure in which the learn-region is divided by three parameters, such as the engine speed, the engine torque, and the generating current. The learn-region can be divided by one or two parameters. Alternatively, the learn-region can be divided by four parameters. The learn-region may not be divided to learn single torque correction amount.

According to the present embodiment, since the RPGT is gradually changed during a learn-period of the torque correction amount, the fluctuation in engine speed and/or the acceleration/deceleration of the vehicle can be restricted. That is, the variation in the RPGT during the learn-period is controlled in such a manner that the variation in engine speed and the variation in acceleration/deceleration are within a predetermined range. This control is executed during a learn-period. After learning, this control is terminated.

What is claimed is:

1. A controller for an internal combustion engine equipped with a component driven by the internal combustion engine, comprising:
    a component torque calculating means for calculating a required component driving torque which is required to drive the components according to a required value;
    an engine torque calculating means for calculating a required engine torque which is obtained by adding a required vehicle driving torque to the required component driving torque, the required vehicle driving torque representing an engine torque which is required to drive a vehicle;
    an intake air calculating means for calculating a required intake air amount which is necessary to generate the required engine torque;
    an intake air controlling means for controlling an intake air amount based on the required intake air amount;
    a base engine torque estimating means for estimating an actual intake air amount which is introduced into a cylinder, and estimating a base engine torque which is generated with the estimated intake air amount;
    a torque correction means for correcting the engine torque by correcting an ignition timing based on a difference between the required engine torque and the base engine torque;
    an actual engine torque estimating means for calculating a torque correction amount based on a correction amount of the ignition timing, and estimating an actual engine torque based on the calculated torque correction amount and the base engine torque;
    a permitted torque calculating means for calculating a difference, as a permitted component driving torque, between the actual engine torque estimated by the actual engine torque estimating means and the required vehicle driving torque; and
    a component controlling means for controlling the component based on the permitted component driving torque.

2. The engine controller according to claim 1, further comprising
    a guard means for setting a limit of an ignition timing correction, which is executed by the torque correction means, according to an engine driving condition, wherein the torque correction means sets a correction amount of the ignition timing in such a manner that the torque correction amount is brought to be close to the difference between the required engine torque and the base engine torque within the limit of the ignition timing correction.

3. The engine controller according to claim 1, wherein the component is at least one of a alternator, a compressor for air-conditioner, a compressor for power steering, and a motor generator.

4. The engine controller according to claim 1, wherein the base engine torque estimating means estimates the base engine torque based on a estimated intake air amount which is introduced into a cylinder and the ignition timing and/or a fuel injection amount which are predetermined based on the engine driving condition.

\* \* \* \* \*